(12) United States Patent
Joyeau et al.

(10) Patent No.: US 6,898,643 B2
(45) Date of Patent: May 24, 2005

(54) DEVICE AND METHOD FOR CONTROLLING ACCESS TO COMPUTER PERIPHERALS

(75) Inventors: Sylvain Joyeau, Rennes (FR); Anne Abiven, Cesson Sevigne Cedex (FR); Vicente Sanchez-Leighton, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 245 days.

(21) Appl. No.: 09/882,301

(22) Filed: Jun. 18, 2001

(65) Prior Publication Data

US 2002/0029311 A1 Mar. 7, 2002

(30) Foreign Application Priority Data

Jun. 16, 2000 (FR) .............................. 00 07751

(51) Int. Cl.[7] ................................ G06F 3/00
(52) U.S. Cl. ................ 710/3; 710/15; 710/62
(58) Field of Search ................. 710/3, 22–28, 710/62

(56) References Cited

U.S. PATENT DOCUMENTS

| | | | |
|---|---|---|---|
| 5,444,853 A | * 8/1995 | Lentz | |
| 5,659,798 A | 8/1997 | Blumrich et al. | 395/846 |
| 5,815,647 A | * 9/1998 | Buckland | |
| 5,915,124 A | * 6/1999 | Morris | |
| 5,991,275 A | 11/1999 | Abiven et al. | 370/254 |
| 6,122,267 A | 9/2000 | Abiven et al. | 370/338 |
| 6,195,720 B1 | 2/2001 | Abiven et al. | 710/128 |

FOREIGN PATENT DOCUMENTS

EP  0 689 146 A  12/1995

* cited by examiner

*Primary Examiner*—Jeffrey Gaffin
*Assistant Examiner*—Alan Chen
(74) *Attorney, Agent, or Firm*—Fitzpatrick, Cella, Harper & Scinto

(57) ABSTRACT

The invention concerns the sharing and the controlling of access to at least one peripheral for a computer system which includes a central processing unit and at the least one peripheral which has a physical interface to the central processing unit. Specifically, a request for access is received at an address of a virtual interface, where the address of the virtual interface corresponds to the physical interface, and data is exchanged between the central processing unit and the at least one peripheral is received. The received data is modified according to at least one predetermined criterion corresponding to the address of the virtual interface.

13 Claims, 8 Drawing Sheets

DEVICE AND METHOD FOR CONTROLLING ACCESS TO COMPUTER PERIPHERALS

BACKGROUND OF THE INVENTION

1. Field of the Invention

The present invention relates to a computer device, and in particular relates to a device for controlling peripherals by means of a software application executed on a multi-task capable computer system.

2. Description of the Related Art

In current multi-task capable systems, applications have access to a specific peripheral through software known as the peripheral driver. The peripheral driver generally offers a operating system a generic or abstract view of a given peripheral.

On the one hand, by providing an abstract peripheral driver, the design, development and information-carrying ability of a software application is simplified. Furthermore, the communications between several applications and the peripheral are centralised and co-ordinated by the peripheral driver, making it possible to share a peripheral between several applications, while preserving the integrity of the system.

Using an abstract peripheral driver, however, causes a major handicap in a system where a high performance level is necessary. Specifically, the applications cannot entirely exploit the particular capacities of the peripherals, since the applications must conform to the protocol for communication with the driver. The applications cannot communicate directly with the peripheral interface.

In order to attempt to resolve these problems, several isolated solutions have been proposed.

First of all the direct memory access (DMA) mechanism is known, for the transfer of data between the central memory and a given peripheral without the intervention of the central processing unit (CPU).

DMA allows an application to specify the address of a buffer block and the implied size in the next command.

However, on the one hand, fairly generally, the current peripherals can use an address only in physical form (not in virtual form) and, on the other hand, in a multi-application system, the operating system sets up a virtual memory management unit (in order to switch more easily between the memory spaces of the applications.

Because of this, in a standard multi-application system, each request involving a direct memory access (DMA) mechanism therefore passes through the operating system (OS) in order to convert the virtual addresses supplied by the application into physical addresses which can be understood by the peripheral involved. The operating system is once again used.

A method, described in U.S. Pat. No. 5,659,798 ("Method and system for initiating and loading DMA controller registers by using user-level programs", Blumrich) adds a few functions to the operating system and an associated hardware mechanism in order to avoid the operating system in programming by DMA. It uses in particular an address decoding module inserted on the bus system, and a particular initialization of the virtual space of each application. The application can then directly supply the physical addresses and the sizes of the buffers, while guaranteeing the integrity of the system.

This method for preventing access to the operating system is however limited to the programming of the DMA mechanism, and in no way makes it possible to access the programming of the whole of the interface of a peripheral.

The I2O protocol method has also been utilized, which uses a specific input/output processor (IOP), placed between the central memory and the peripherals, to relieve the CPU of the processing of the interrupts during high-throughput processing.

In this protocol, a software driver is developed which is common to an entire class of peripherals (for example all the network interfaces), specific to an operating system. Each peripheral manufacturer in this class then develops a specific software driver which will be executed on the IOP.

There is then found a reduction in the processing of the tasks specific to a particular class of peripherals by the operating system. However, this is achieved at the cost of an increase in the level of abstraction of the access to the peripherals by the applications (with commands controlling a single driver common to an entire class of peripherals).

SUMMARY OF THE INVENTION

The problem formulated here is then to provide direct access without abstraction to different applications executed on a multi-task capable system, while guaranteeing the integrity of the system.

The invention relates firstly to a device for sharing and controlling access to peripherals for a computer system comprising a CPU and at least one input/output peripheral having a physical control interface accessible to the central processor, characterized in that said device has means for the faithful reproduction, in the form of a virtual interface, of the physical interface of at least one peripheral, means of interception, by said virtual interface, of all the requests and data exchanged between the central processor and the peripheral, controlled by a pre-determined application executed in the system, means of possible modification of the requests and data intercepted according to at least one pre-determined criterion.

It will be understood that, through this arrangement, the applications executed on the system can access the peripherals directly, without passing through the driving unit, and by therefore choosing a level of abstraction of the commands adapted to their needs. It is then possible for each application to specialize the programming of the peripheral in order to best use its performances according to the required result, specific to the application.

The creation of a virtual interface reproducing almost identically the physical interface of the peripheral makes it possible to carry out access filter functions in read or write mode for the peripheral, and therefore to preserve an integrity check for the system (that is to say to isolate any error occurring in a particular application without affecting the other applications). The virtual interface reproduces a maximum subset of the physical interface. It thus makes it possible to exploit in the same way the main functions offered by the peripheral.

To simplify, this mechanism can be seen as a transposition of the virtual memory mechanism to the accesses to the peripherals, with an additional filtering functionality, and a much finer access granularity.

It should be stated that, in the case of the virtual memory mechanism, the granularity of the protected space is called the page (the term known to the person skilled in the art), a page being a memory area of 4, 8, 16, 64 or even more kilobytes. A virtual page is spoken of when it is seen by the application. A physical page resides in the physical memory of the system (RAM) or on the disk. The virtual memory mechanism associates the virtual pages of the applications with the physical pages, each virtual page being allocated a set of attributes for qualifying the rights of access to the virtual page by the application. In the case of the Pentium, for example, a page can be either in read mode only, or in read and execution mode or in read and write mode or inaccessible.

In the laid out mechanism the granularity of the protected entity is the register of the physical interface, that is to say 8, 16, 32, 64 or more bits. This elementary entity will be called an I/O page. Seen from the application the I/O pages are virtual, and seen from the rest of the system the I/O pages are physical. For example, the DMA programming register denoted 135 at FIG. 7, which will be described subsequently, is a virtual I/O page, whilst the register implemented in the physical interface of the interface denoted 9*a* is a physical I/O page denoted 136. As in the virtual memory mechanism, the application can be allocated, in its addressing space, a certain number of virtual I/O pages, whose accesses are functionally protected by means of the mechanism presented. It will be understood that the virtual physical interface, composed of a set peculiar to the physical registers peripheral, or physical I/O pages, consists of the association of physical I/O pages with virtual I/O pages in the addressable memory space in the application. As in the case of the virtual memory, the association of each virtual I/O page with its physical I/O page is allocated attributes allowing control of the integrity of the system when there is access to the physical I/O page by several applications. This is because qualifying each virtual I/O page, these attributes make it possible to modify the data read or written by the application through its virtual I/O page. In addition to the access authorisation rights in read and/or write mode, these attributes contain a bit mask. Each data item written by the application in a virtual I/O page, enabled by its attributes to be modified, is transmitted to the physical I/O page passing through the mask. The data running over the reverse path, from the physical I/O page to the virtual I/O page of an application, also passes through the mask.

According to a preferred arrangement, the reproduction means in the form of virtual I/O pages of a physical interface peripheral comprises a virtual memory space reserved for the image of the physical interface, peculiar to each application executed by the computer system, containing the virtual I/O pages of the application, a means for linking the addresses of these virtual memory spaces to the physical interface address, containing the physical I/O pages.

According to a particular embodiment, the interception means comprises on the one hand an interface with the bus connected to the central processing unit, and an interface with the bus connected to the peripherals, on the other hand an address decoding means.

The address decoding means makes it possible to determine which accesses must be modified in order to take account of an integrity criterion for the system.

According to a more particular embodiment, the modification means comprises a means of filtering the requests intercepted by the interception means, according to at least one criterion stored in a memory means.

According to an even more particular embodiment, the filtering means is incorporated in a modifiable memory device.

According to a first embodiment, in the hardware, the device is composed on the one hand of a module inserted between the central processing unit and the peripherals bus and on the other hand a software element previously stored in a memory device of the central processing unit and executed by the operating system when the system is initialized.

The invention relates more generally to a telephone, a photographic apparatus, a printer, a scanner, a camera, a computer, a facsimile machine, a television receiver or an audio/video player, characterized in that these data processing appliances include a device as briefly described above.

The invention also relates to an information storage means which is removable, partially or totally, and which can be read by a computer or a microprocessor storing portions of code of a computer program, making it possible to implement the method succinctly described above.

The invention also relates to a computer program product which can be loaded into a programmable apparatus, containing portions of code for implementing the steps of the method as briefly disclosed above, when the program is executed on a program able apparatus.

The description and the drawings which follow will give a better understanding of the aims and advantages of the invention. It is clear that this description is given by way of example, and is non-limiting.

DETAILED DESCRIPTION OF THE PREFERRED EMBODIMENTS

Figure 1:
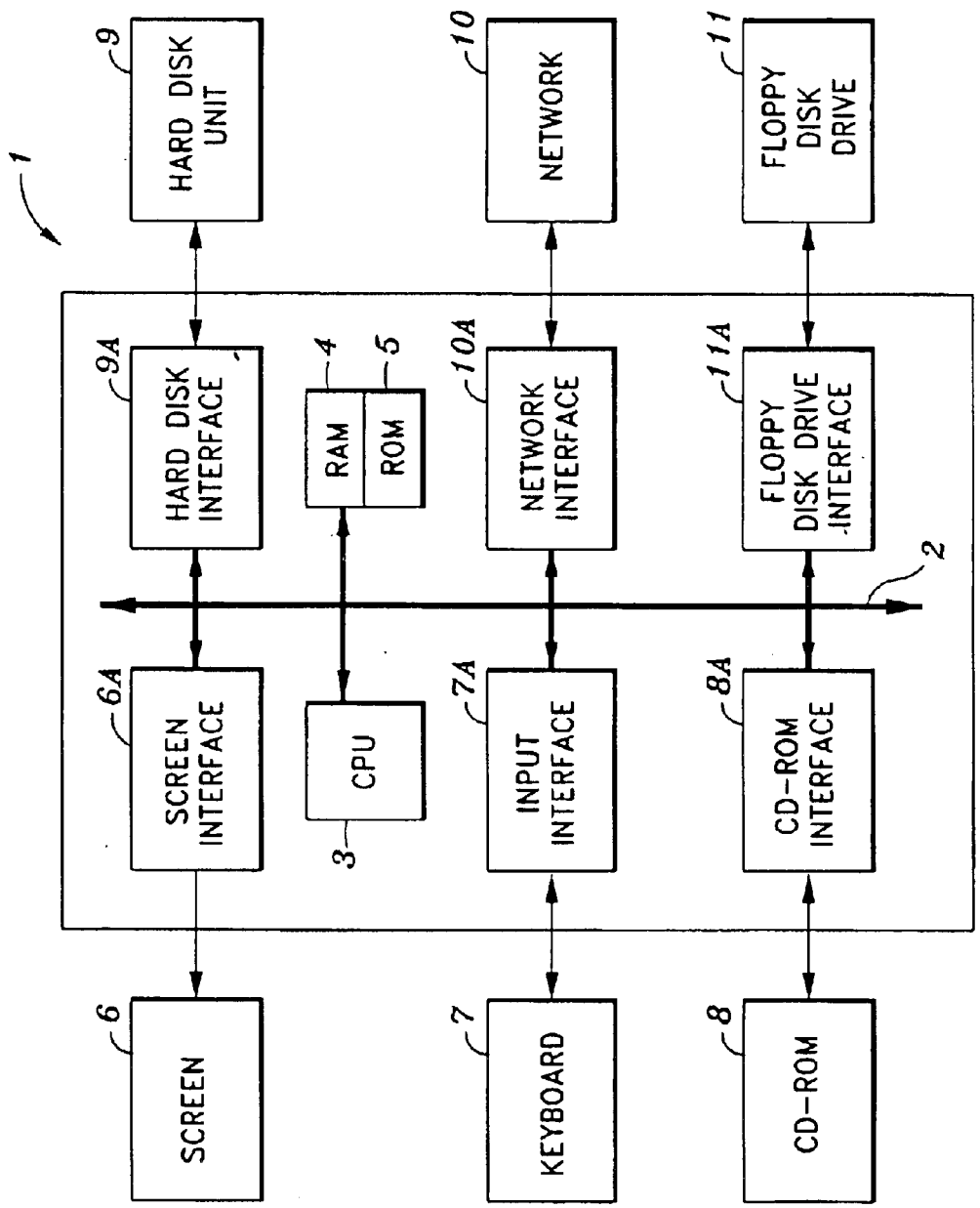
FIG. 1 is a block diagram depicting a conventional computer system.

In general terms, the invention is an application normally executed on a computer system of a conventional type, such as the one illustrated in FIG. 1.

Such a computer system has, on a processing board 1, connected together by an data bus 2 a central processing unit (CPU) 3, for example of the Pentium type, (registered trade mark of Intel); a random access memory (RAM) 4; a read only memory (ROM) 5; a plurality of peripherals connected to the data bus 2 by interfaces, including an internal memory, these peripherals comprising a screen 6 with a screen interface 6A and an internal memory (not shown); a keyboard 7 with a keyboard interface 7A and an internal memory (not shown); a CD-ROM drive 8 with a CD-ROM drive interface 8A and an internal memory (not shown); a hard disk unit 9 with a hard disk interface 9A and an internal memory (not shown); a network 10 with a network interface 10A and an internal memory (not shown); a floppy disk drive 11 with a floppy disk drive interface 11a and an internal memory (not shown).

Each of the elements illustrated in FIG. 1 is well known to the person skilled in the art of information processing systems. These elements are therefore not described here in any further detail.

The random access memory 4 stores data from variables and intermediate processing results, in memory areas, bearing the same names as the data whose values they store.

The read only memory 5 is adapted to store, for example, in areas which have the same names as the data which they store.

The operating program of the central processing unit 3, for example, is stored, in an area denoted "program".

The central processing unit 3 is adapted to implement the computer peripheral access control method which will be disclosed below.

Figure 2:
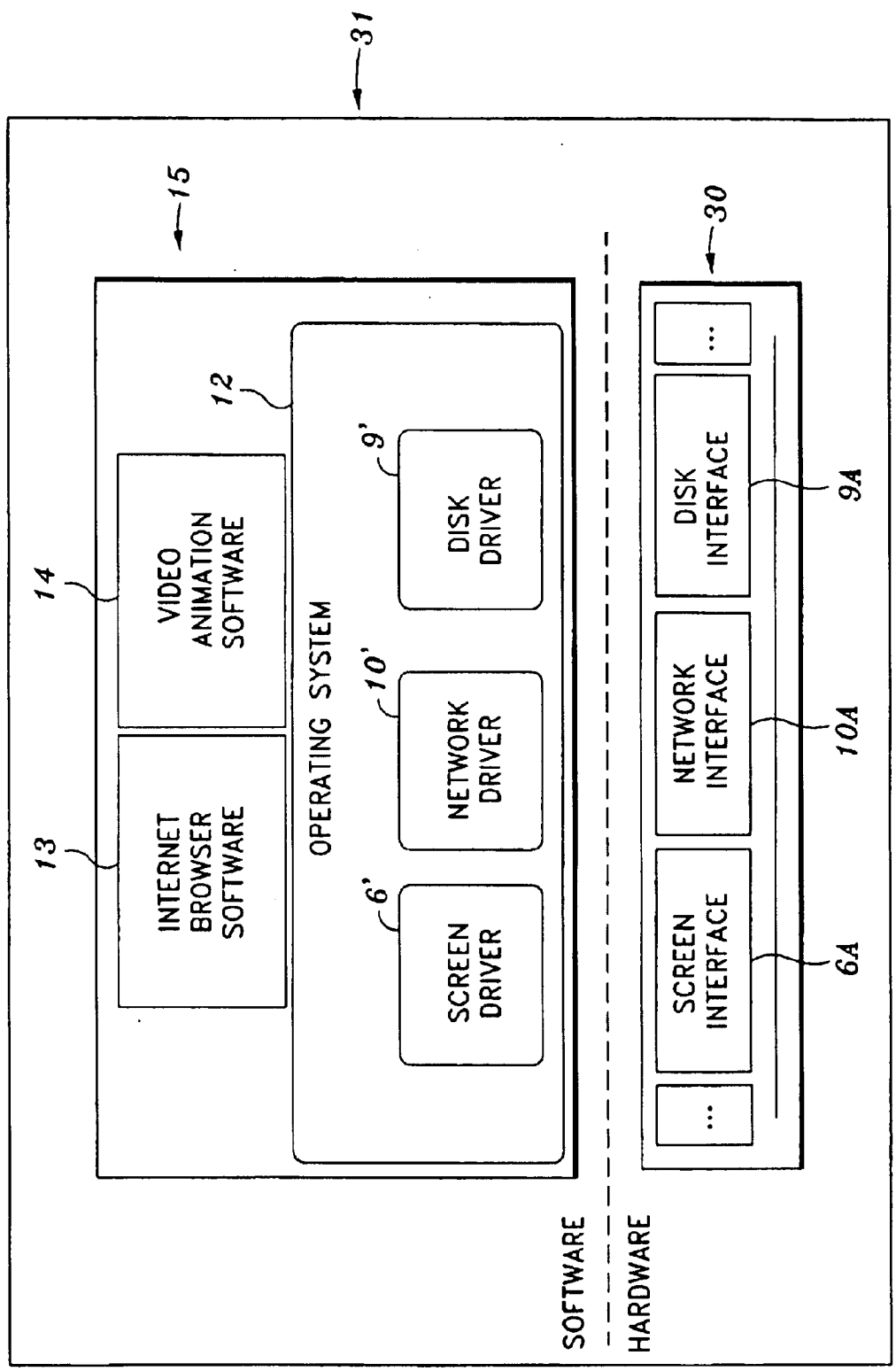
FIG. 2 depicts the software architecture executed on the computer system illustrated in FIG. 1.

The invention applies notably with regard to the management of access to the peripherals, such as screen 6 and floppy disk drive 11, by software applications, that is to say in practice with regard to the data bus 2 (for example of the PCI type in the remainder of the description) between the central processing unit 3 on which an operating system and applications are executed and the peripherals The term resource will also be used in the remainder of the description in accordance with current usage, in order to designate peripherals. As illustrated by FIG. 2, a peripheral interface 31 has both a hardware component 30 and a software component 15.

The hardware component 30 consists of a "daughter" board, plugged onto the main board or integrated into one of the silicon circuits fixed to the main board, for example the screen interface 6A, the network interface 10A, or the disk interface 9A.

The associated software component is a peripheral driver program, specific to each peripheral, such as a screen driver 6', a network driver 10' and a hard disk unit driver 9'. These drivers conventionally form part of the operating system 12, executed by the CPU 3.

The software component 15 of the peripheral interface 31 contains applications, such as for example Internet browser software 13, or video animation software 14. These applications are also executed by the operating system 12 and send many successive requests in read or write mode to the different peripherals which they need at a given time, such as screen 6, network 10, or hard disk unit 9.

These applications are executed in parallel in a multi-task capable system.

Before describing any further the device and method according to the invention, information will be given relating to the computer system peripheral registers.

In general terms, the peripheral interfaces, such as hard disk interface 9A, includes sets of programming registers for a peripheral. These programming registers can be divided into three groups. The first, the state registers RE, make it possible to know the state of the peripheral. For example, they contain information indicating that the peripheral has terminated the last request which it has received, or that it is ready to process another one.

This type of state register RE is intended to be solely read by one application, without there ever being a write operation by the application in this state register RE.

The second programming registers, the parameter registers RP, are accessible to an application both in read and write mode.

They make it possible to make known to the peripheral the different parameters of a request which will follow. For example, these parameters include the cylinder, sector and head numbers in the case of a hard disk interface 9A, or the address of writing the next packets when a network interface 10A is received.

Neither reading nor writing in these registers RP triggers any particular process with regard to the peripheral itself, except the storage of parameters.

The last programming registers, the control registers RC, are generally useful only in writing mode.

This is because it is by writing in a control register RC that the order of triggering a request is transmitted to the peripheral.

The value transmitted to the peripheral by the writing in this control register can contain a last decisive parameter, such as the type of request (transmission request, reception request, etc), but the value transmitted may also be arbitrary and, in this case, it is the simple fact of writing in such a register RC which triggers the peripheral command.

The definition of these three types of peripheral register leads logically to the definition of protection models which must guarantee the operating system vis-à-vis the manipulation of these registers RE, RP, RC by applications. There are then four main types of protection:

(A) Guarantee of the integrity of the data and of the code of the other applications in the course of execution.

Typically, the operating system 12 must guarantee, in the case of access to a peripheral, that an application cannot overwrite a memory area (in the random access memory 4 of the system) of another application when data are received.

This constraint can be ensured by filtering the memory addresses, or more generally the parameters, supplied by the application to the peripheral.

(B) Guarantee that the manipulation by a given application does not interfere with the interaction of tghe peripheral with the other applications.

It will be understood that, for example, an application must not be able to issue a general reset instruction to the peripheral, when other applications are not prepared for such a reset.

This constraint may be ensured by filtering the control instructions sent by each application.

(C) Guarantee that the result of the reading of a state register does not cause an error in an application.

It is for example clear that the information indicating that the last request has been executed (a bit in a state register RE) must be able to be read only by the application responsible for this particular request. However, this information must not be read by another application which has just sent a new request which has not yet been interpreted by the peripheral.

On the other hand, information indicating that the peripheral is available and ready to process a new command must be accessible to all applications.

The reading of the state registers RE must therefore only be partially filtered.

(D) Guarantee of correct distribution of the data intended for the different applications.

If an example is taken here of the management of a peripheral of the hard disk interface 9A, it is found that, when data are read on a hard disk unit 9 by an application such as internet browser software 13, the data in a sector are recovered by the application by reading them one after the other in a specific input/output port of the hard disk interface 9A.

After each reading, the following data item is available on the port. If a second application such as video animation software 14 is enabled to read this port, the first application generating the reading instruction will suffer the loss of at least some of the data which it is to read, these data being read by, the second application.

For a peripheral of the hard disk interface 9A, the operating system 12 must therefore filter the accesses in read mode to this type of data register.

Figure 3:
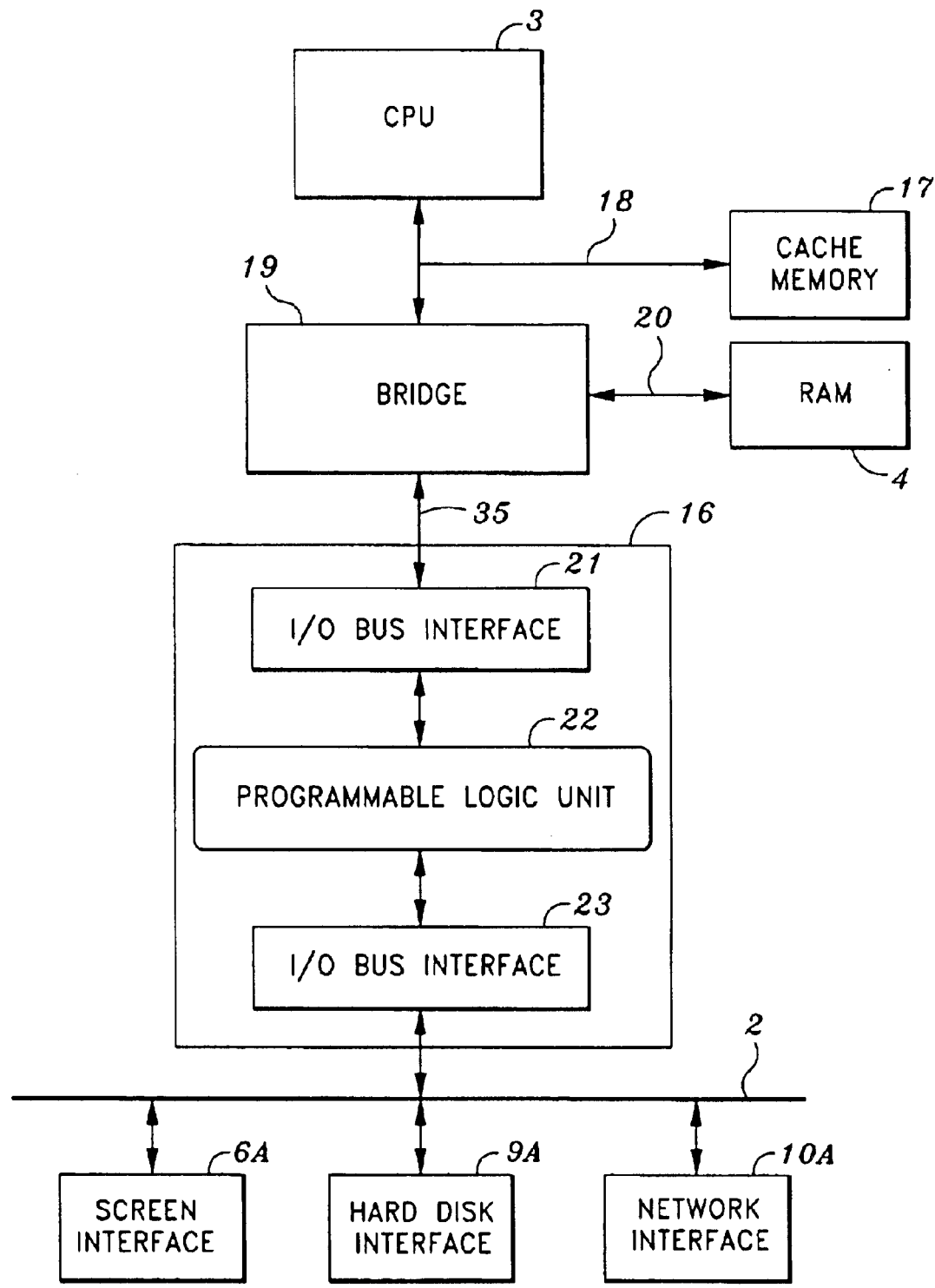
FIG. 3 is a block diagram depicting the device according to the present invention.

The device according to the invention, a general configuration of which in hardware implementation form is illustrated in FIG. 3, is composed of a module 16 inserted logically between the pair formed by the central processing unit 3 and the random access memory 14 on the one hand and the data bus 2 for the peripherals, such as screen 6, hard disk unit 9 and network 10 on the other hand (it is a case there in some way of a component serving as an interface between the processor and the PCI bus).

To facilitate an understanding of the remainder of the description, the cache memory 17 of the central processing unit 3, connected to the latter by a system bus 18, has also been illustrated here. A bridge 19 has also been depicted, for arbitrating and computing accesses to the random access memory 4 and which is connected to the memory by a memory bus 20. These components are known per se to the person skilled in the art.

Functionally, the module 16 described here by way of non-limiting example then includes an input/output (I/O) bus interface 21 connected by the input/output bus 35 to the pair formed by the central processing unit 3 and the RAM 4 by means of the bridge 19, a programmable logic unit 22, a input/output (I/O) bus interface 23 connected to the data bus 2.

The programmable logic unit 22 (for example implemented in the form of an ASIC) intercepts all the accesses in read and write mode on certain shared peripherals, and can modify the data transferred during these accesses, in accordance with a pre-programmed scheme, defined when the computer system is initialized (when the computer system is started up), by the operating system 12.

The programmable logic unit 22 of the module 16 has notably a vector field accessible in the physical space of the central processor unit 3 in an area 160 (FIG. 5) and making it possible to link the addresses of the virtual I/O pages to the physical I/O pages, a memory 25 of the module 16 containing bit fields 132, 142 (FIG. 5) specifying the filtering patterns for the installed applications.

It will be understood that the operating system 12 can thus make available to applications, specifically modified to take advantage of the invention, a direct access to the peripherals connected to the module 16, thus guaranteeing the integrity of the operating system 12 (that is to say in particular by satisfying conditions (A) and (D) defined above.). This is explained by the fact that all the data passing between the applications and the peripherals pass through the programmable logic unit 22.

More precisely, the programmable logic unit 22 is composed (see FIG. 4) of an address decoder 24, a memory 25 and a programmable filter 26, disposed for example on an electronic card 27, alongside I/O bus interfaces 21 and 23.

The module 16 is inserted in series with the PCI bus (in the case of a bus of the PCI type) connected to the random access memory 4.

The input/output bus interface 21 connected to the central processing unit 3 sends to the address decoder 24 the addresses included in the requests sent to the peripherals, in read or write mode. According to the address decoded in a request and the direction of transfer (read or write), the address decoder 24 selects a filtering pattern in the memory 25 (where the local memory being initialized by the operating system 12 when the computer system is started up).

The data item included in the request is sent to the programmable filter 26 connected to the memory 25 and in which the filtering pattern is applied to this data item. This filtering pattern indicates to the programmable filter 26 the function to be applied individually to each of the bits of the data item. Thus the programmable filter 26 can either leave the bit unchanged, or force it to 0, or force it to 1.

Each of these filtering patterns constitutes a criterion for checking the integrity of the system.

The modified data item issuing from the programmable filter 26 is then sent to the input/output bus interface 23 connected to the data bus 2 of the peripherals and indirectly to the peripherals.

The device according to the invention also has a software part, which supplements the hardware part formed by the module 16.

This software part is necessary for correctly exploiting the functions of the module 16 by means of the applications and the operating system 12.

To this end, when the system executed on the central processor 3 is initialized, the operating system 12 installs, in the virtual memory space 130, 140 (FIG. 5) of the applications, access 133, 143 to the physical address space 170 in a particular decoding area 131, 141 of the module 16, referred to as the virtual I/O pages area. This is effected for each application liable to request access in read or write mode to a particular peripheral (for example, the hard disk interface 9A). It should be noted by way of clarification that the memory addresses 133 and 143 correspond to the virtual memory addresses peculiar to each application, whilst the areas 131 and 141 are visible in the physical addressing space for the CPU 3. Thus, the virtual I/O pages of the peripheral interface 9A are situated in the decoding area 131, 141 and in the area 133, and in the area 143.

The size of the virtual I/O pages areas 131, 141 is equivalent to the size of the memory space occupied normally by the hard disk interface 9A of the hard disk unit 9 in question and containing the physical I/O pages.

The application 13, 14 reads and writes the data exchanged with the physical interface in the I/O pages 131, 141.

The operating system 12 next initializes, for each application, two vector fields 160, 161 of the module 16, specifying the correlation between the addresses of the virtual I/O pages decoding areas 131, 141 and the addresses of the physical I/O pages of the peripheral.

Finally, the operating system 12 initializes, for each application, an area 133, 143 in the memory 25 of the module 16, corresponding respectively to the virtual I/O page decoding areas 131, 141, with the filtering patterns (the number of filtering patterns varying according to the peripherals) to be applied to each access of the application.

It should be noted that the patterns are partially identical for the peripheral. During the filtering, the DMA addresses (the parameters of the requests) are for example filtered differently in order to take account of the translation scheme of the virtual addresses/physical addresses of each application for the same peripheral. On the other hand the patterns of the control registers will potentially be identical.

Figure 5:
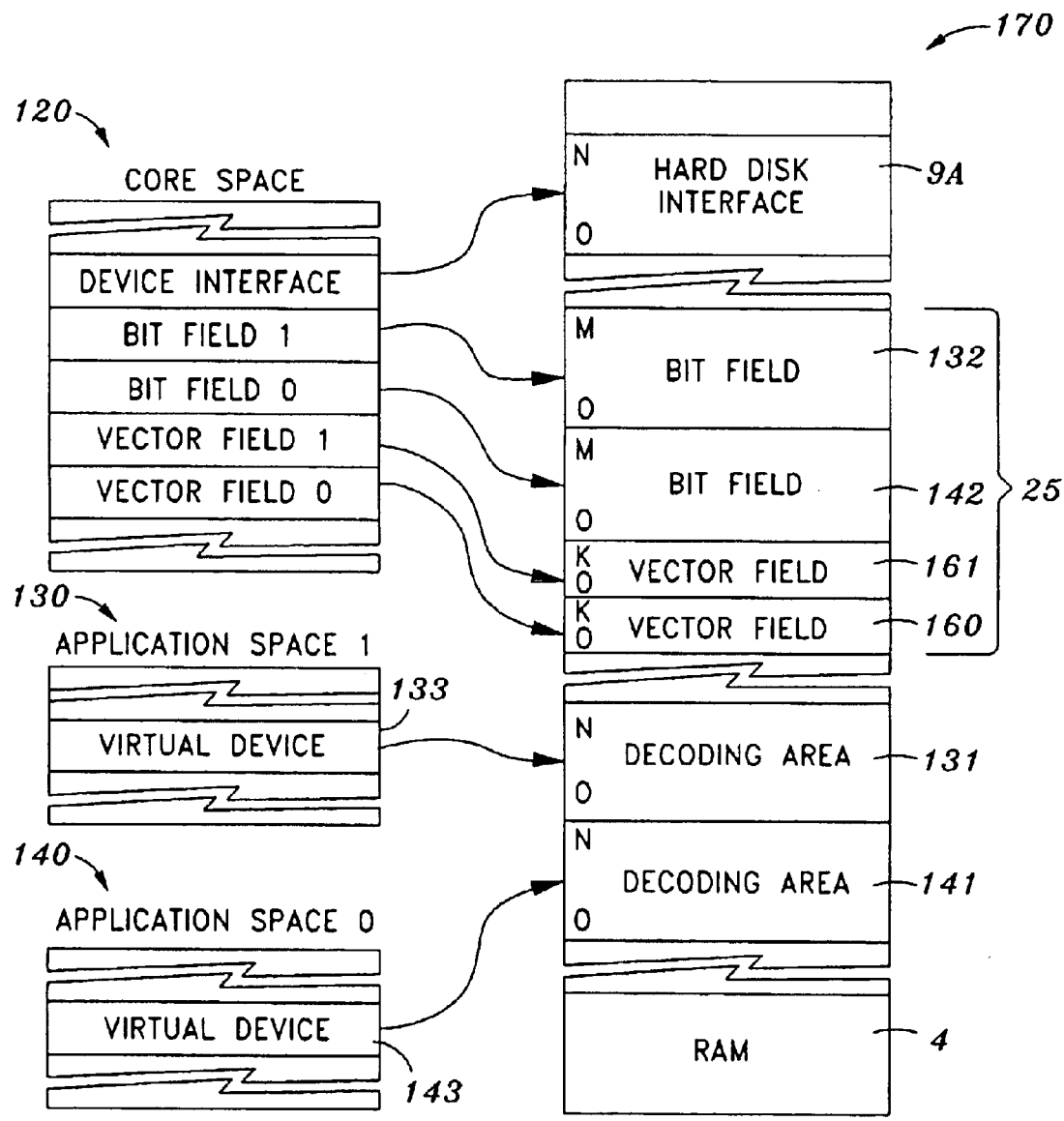
FIG. 5 depicts an example of an addressing space in a computer system where two applications are sharing the same peripheral.

By way of clarification FIG. 5 then depicts an example of an addressing space in a computer system where there reside two applications 13, 14 sharing the same peripheral.

The operating system 12 can gain access, through its virtual space 120, on the one hand to the vector fields 160, 161 (of the module 16), and to the two bit fields 132, 142 containing the filtering patterns of the virtual I/O-page decoding area 131, 141 for each of the two applications (sharing the same peripheral) respectively, and, on the other hand, to the registers contained in the physical interface of the peripheral.

Each application has access, through its virtual memory space 130, 140, in addition to the central memory normal for its execution (not shown), only to the decoding areas 131, 141 decoded by the module 16.

In FIG. 5, the value N corresponds to the size of the physical interface accessible to the central processor unit 3.

The value M corresponds to the size of the bit field necessary for coding all the filter corresponding to the physical interface. For example, if the size of the physical interface is 64 bytes, that is to say 64*8=512 bits, then it is each of these 512 physical I/O pages bits that the module 16 must filter. Relying on an example illustrated by FIG. 7, each bit can be left unchanged, or forced to 1, or forced to 0. An elementary bit field must therefore have at least one of these three behaviours. By coding the behaviour itself in binary form, it occupies 2 bits (4 values). Finally, the size N necessary for coding all the 512 bit filters is 512*2=1024 bits, that is to say 10241/8=128 bytes.

The value K corresponds to the size of the vector field necessary for describing the translation between the addresses of the virtual I/O pages decoding areas 131, 141 and the addresses of the physical I/O pages. Given the high number of possibilities of coding the translation means, only the two extremes will be evoked. Specifically, either the translations are fixed and non-modifiable, and, in this case, the size of the vector field is 0; or the translation of each virtual I/O page address is described individually. Calling the size of the physical address bus (3, 4, 5 bytes or more), q, each vector field then occupies a space of K=q*M bytes. Taking again the example of the interface containing 64 bytes of I/O pages, the size of the vector field therefore occupies on a 32-bit bus (4 bytes) 4*64=256 bytes.

Figure 6:
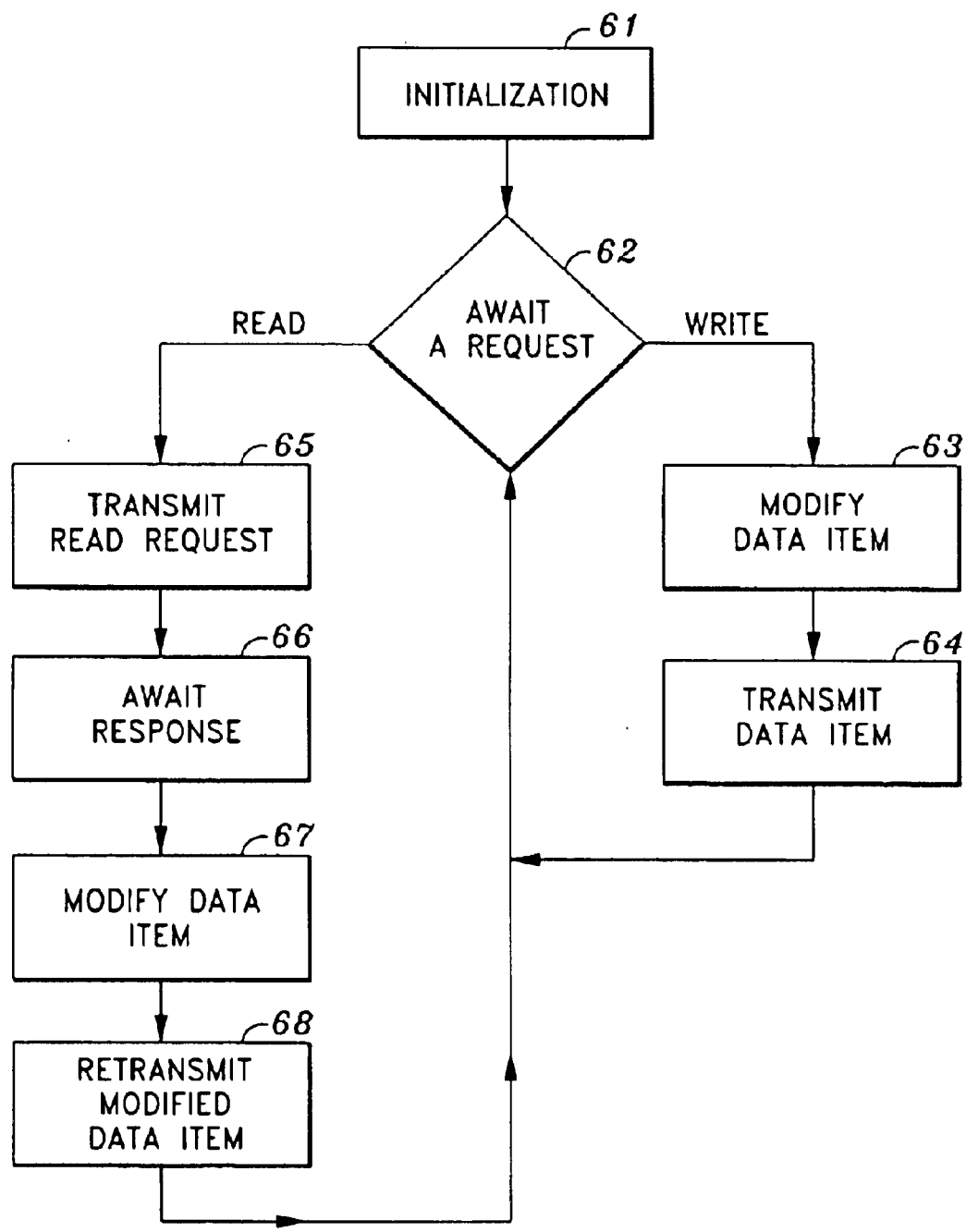
FIG. 6 is a flow diagram depicting processing according to of the present invention.

With regard to the method of controlling access to the peripherals, it then comprises the following steps, illustrated by FIG. 6.

In a first step 61, as has just been seen, when the computer system is started up, the operating system 12 initializes the memory 25 of the module 16 by sending the filtering patterns to it, to be applied to the addresses of the relevant I/O pages of the shared peripheral (these filtering patterns previously being recovered from a memory of the system in the form of a bit field, for example).

The module 16 then waits in a step 62 until it receives a request from an application for reading or writing at the addresses of the virtual I/O pages 131, 141. This request is intended for the shared peripheral.

In the case of a write command coming from the central processing unit 3 (a command sent by an application executed by the central processing unit 3), the data item is modified in a step 63 in accordance with what has been disclosed. The data item is then applied to the data bus 2 on the peripherals side in a step 64, via the I/O bus interface 23, in order to transmit the data item to the corresponding physical I/O page.

In the case of a write command on a virtual I/O page, the read request is transmitted to the peripheral in a step 65 in order to read the corresponding physical I/O page. Then the device 16 awaits a response from said peripheral in a step 66. The data item to be modified is then the one coming from the data bus 2 on the peripherals side. This data item is then modified in a step 67, and then the data item once modified is applied to the processor bus 2' at the level of the central processing unit 3, in a step 68.

Figure 7:
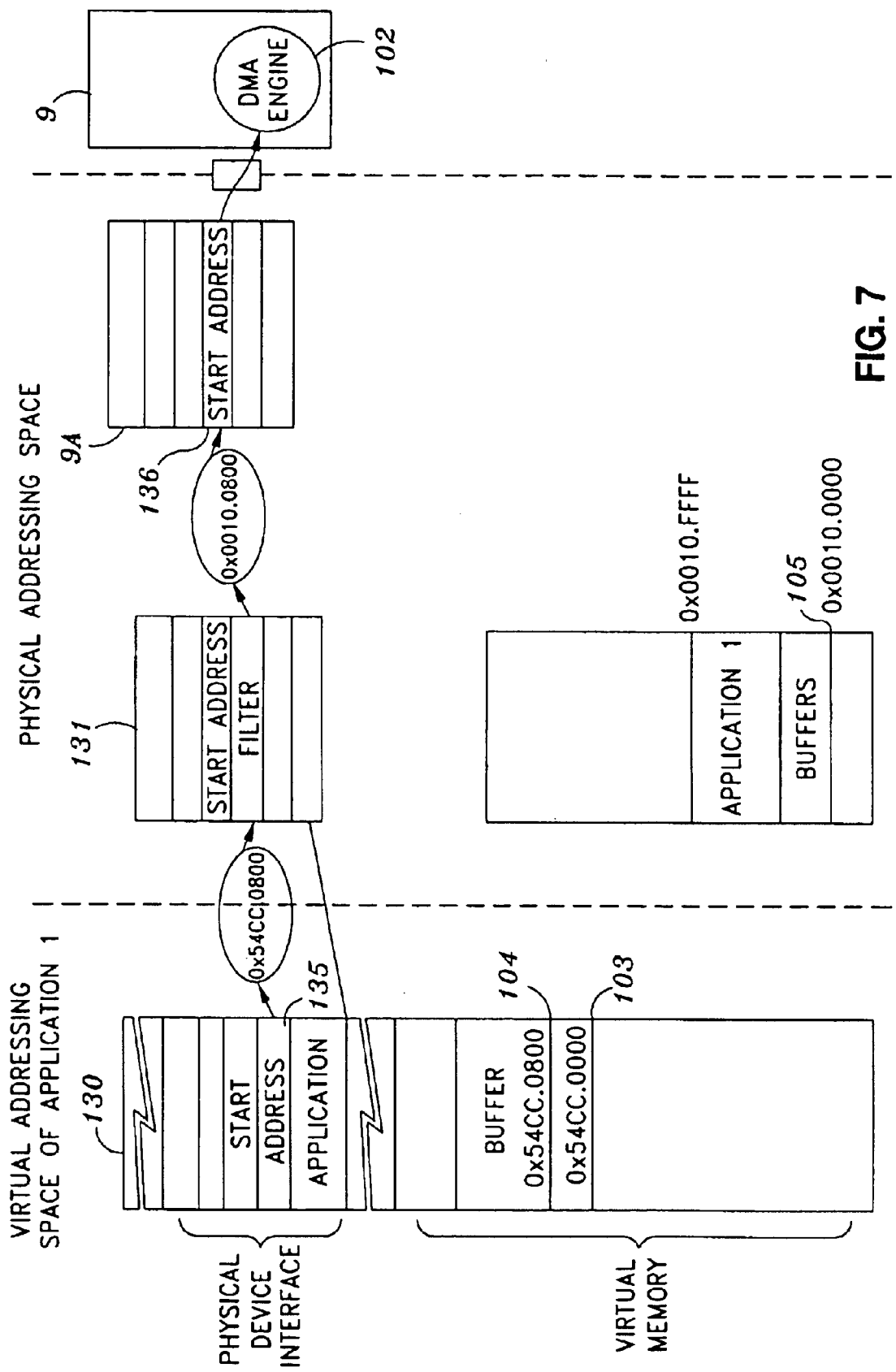
FIG. 7 gives an example of a mechanism used for the direct implementation of a DMA engine by the application, without the intervention of the operating system.

In the example already cited in FIG. 7, the module is used notably to guarantee this integrity when blocks are transferred by the DMA mechanism 102 proposed by the peripheral. When the application is initialized, it requests from the system virtual access to the peripheral, requesting a virtual address area 103 which will be used for transferring data, 64 kilobytes in the example. Knowing the physical addresses 105 of the transfer area 103 of the application, the operating system executed on the processor 3 initializes the filtering pattern of the DMA address register in the bit field 132 accordingly; knowing that the buffer area 105 of the application extends from 0×0010.0000 (in hexadecimal base) to 0×0010.FFFF, the filtering pattern must leave bits 0 to 15 unchanged, force bits 16 to 19 and 21 to 31 to 0 and bit 20 to 1. Thus, whatever the value written by the application in the DMA register of virtual interface 133, the value sent to the physical interface will always be in the area 105 belonging to the application.

It will be understood that a peripherals sharing device has indeed been set up, guaranteeing the integrity of the system during accesses in read or write mode from and to the peripherals in all types of register in these peripherals. It is clear that the applications must be modified to take advantage of direct access to the peripherals which is then offered to them, and to be able to send commands without any abstraction, to the closest of the commands which can be executed by each peripheral.

This is a principally hardware device, insofar as, apart from the initialization of the memory 25 of the module 16 by the operating system 12, the other tasks of processing accesses to the peripherals are totally taken over by the module 16 according to a hard-wired logic, for example.

This method makes it possible to obtain protection of the accesses as far as the granularity of the bit, since it is capable of monitoring each individual access. In addition, it makes it possible to discharge the CPU cycles (of the central processing unit 3) of the operating system 12, delegating the check on the data transmitted by the module 16.

As a variant, the programmable logic unit 22 is inserted in each of the shared peripherals, instead of being inserted in the primary PCI interface.

Figure 8:
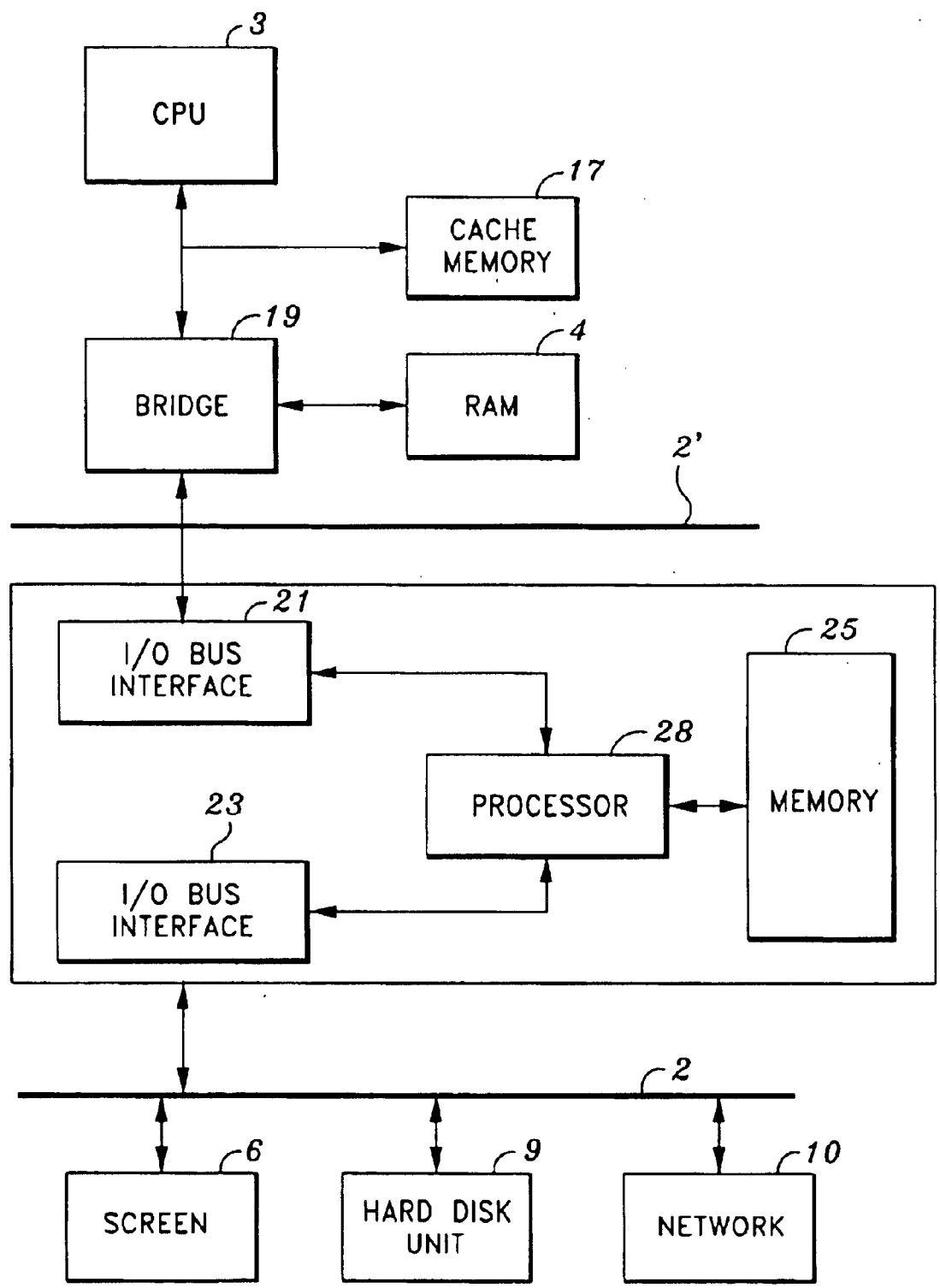
FIG. 8 depicts a hybrid hardware and software device according to an alternate embodiment of the present invention.

In a variant embodiment of the hybrid type including both a hardware and software device and illustrated by FIG. 8, the device is in the form of a more flexible logic, in terms of programmability.

The module 16 then has a processor 28 and a memory 25, connected to the processor bus 2'.

In summary, the processor 28 scrutinises all the accesses of the applications in read mode and in write mode on the virtual I/O pages 131, 141 in order to cause them to undergo any filtering processing before propagating access directly on the physical interface, such as hard disk interface 9A in the decoded areas.

Figure 4:
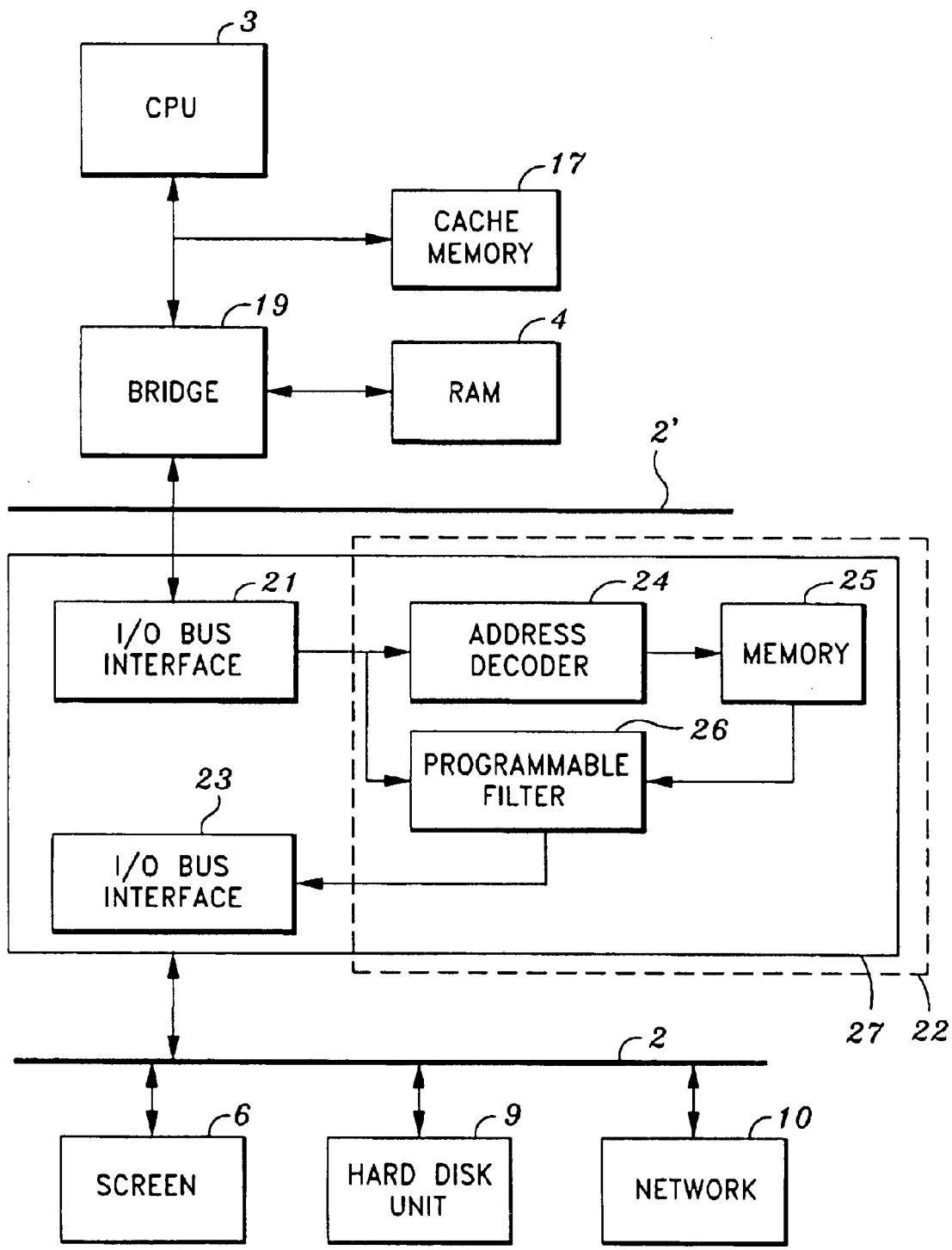
FIG. 4 is a block diagram depicting one example of a hardware implementation of the present invention.

In this variant, the software part executed by the operating system 12 remains identical to that of the hardware implementation disclosed above (FIG. 4).

Likewise, the operating principle remains identical to that disclosed in FIG. 6 and during the description given with reference to this figure.

It will be understood that, moreover, in addition to fulfilling the main filtering function, the presence of a local processor 28 is an opportunity for relieving the central processing unit 3 of certain simple tasks, such as the acknowledgement of requests for example.

According to yet another variant embodiment, purely software this time, the device uses the memory management unit (MMU) of the central processing unit 3, known to the person skilled in the art. It should be stated that the memory management unit MMU makes it possible to associate pages, and therefore virtual addresses, seen by the applications, with physical pages, actually present in the random access memory 4.

The device is based solely on the use of the memory pagination system present in the majority of processors (central processing unit 3) and associated errors. It requires no external device to add to the computer system.

Redirecting the use of the mechanism for translating virtual pages into physical pages, it is then possible to emulate the virtual I/O pages mechanism. This is because, by treating in a particular manner the exceptions generated by the memory management unit MMU during accesses by the applications to the virtual I/O pages addresses 133, 143, it is possible to control the data read and written by these applications from and to the peripherals.

Naturally, the present invention is not limited to the details of the embodiments described here by way of example, but on the contrary extends to any modifications within the capability of the person skilled in the art.

What is claimed is:

1. A device for sharing and controlling access to at least one peripheral for a computer system which includes a central processing unit and the at least one peripheral which has a physical interface to the central processing unit, the device comprising:

request reception means for receiving a request for access at an address of a virtual interface, wherein the address of the virtual interface corresponds to the physical interface;

data reception means for receiving data to be exchanged between the central processing unit and the at least one peripheral; and modification means for modifying the data received by said data reception means, according to at least one filtering pattern selected in accordance with the address of the virtual interface.

2. A device according to claim 1, further comprising:

a memory space reserved for the physical interface, wherein said memory space is peculiar to an application executed by the computer system; and linking means for linking an address of the memory space to an address of the physical interface.

3. A device according to claim 1, further comprising:

a first interface with a bus connected to the central processing unit; and a second interface with a bus connected to the at least one peripheral.

4. A device according to claim 1, wherein said modification means further comprises filtering means for filtering the received request for access, according to the at least one filtering pattern.

5. A device according to claim 1, wherein said modification means further comprises a filter for applying the filter pattern to the data received by said data reception means.

6. A device according to claim 1, further comprising transmission means for transmitting the data modified by said modification means to the physical interface if an application requests an access in a write mode, and for transmitting the data modified by said modification means to the central processing unit if the application requests the access in a red mode.

7. A method for sharing and controlling access to at least one peripheral for a computer system which includes a central processing unit and the at least one peripheral which has a physical interface to the central processing unit, the method comprising:

a request reception step of receiving a request for access at an address of a virtual interface, wherein the address of the virtual interface corresponds to the physical interface;

a data reception step of receiving data to be exchanged between the central processing unit and the at least one peripheral; and a modification step of modifying the data received in said data reception step, according to at least one filtering pattern selected in accordance with the virtual interface.

8. A method according to claim 7, further comprising:

a linking step of linking an address of a memory space to an address of the physical interface, wherein the memory space is reserved for the physical interface, and wherein the memory space is peculiar to an application executed by the computer system.

9. A method according to claim 7, wherein the central processing unit is connected with a bus at a first interface, and wherein the at least one peripheral is connected to the bus at a second interface.

10. A method according to claim 7, wherein said modification step further comprises a filtering step of filtering the received request for access, according to the at least one filtering pattern.

11. A method according to claim 7, wherein said modification step further comprises a filtering step of applying the filter pattern to the data received by said data reception step.

12. A method according to claim 7, further comprising a transmission step of transmitting the data modified in said modification step to the physical interface if an application requests an access in a write mode, and of transmitting the data modified in said modification step to the central processing unit if the application requests the access in a read mode.

13. Computer-executable program code stored on a computer readable medium, said computer-executable program code for sharing and controlling access to at least one peripheral for a computer system which includes a central processing unit and the at least one peripheral which has a physical interface to the central processing unit, the computer-executable program code comprising:

code for performing the step of receiving a request for access at an address of a virtual interface, wherein the address of the virtual interface corresponds to the physical interface;

code for performing the step of receiving data to be exchanged between the central processing unit and the at least one peripheral; and code for performing the step of modifying the data received in said data reception step, according to at least one filtering pattern selected in accordance with the virtual interface.

* * * * *

UNITED STATES PATENT AND TRADEMARK OFFICE
CERTIFICATE OF CORRECTION

PATENT NO. : 6,898,643 B2
DATED : May 24, 2005
INVENTOR(S) : Joyeau et al.

It is certified that error appears in the above-identified patent and that said Letters Patent is hereby corrected as shown below:

Column 1,
Line 16, "a" (first occurrence) should read -- an --.

Column 3,
Line 16, "whilst" should read -- while --; and
Line 52, "on" should read -- and on --.

Column 4,
Line 40, "of" should be deleted; and
Line 55, "an data bus 2" should read -- a data bus 2, --.

Column 5,
Line 25, "peripherals" should read -- peripherals. --.

Column 6,
Line 36, "tghe" should read -- the --.

Column 12,
Line 2, "red" should read -- read --.

Signed and Sealed this

Thirteenth Day of December, 2005

JON W. DUDAS
*Director of the United States Patent and Trademark Office*